(12) United States Patent
Dubois et al.

(10) Patent No.: US 7,123,393 B2
(45) Date of Patent: Oct. 17, 2006

(54) METHOD AND APPARATUS FOR HOLOGRAPHIC RECORDING AND RETRIEVAL

(75) Inventors: Marc Dubois, Clifton Park, NY (US); Robert John Filkins, Niskayuna, NY (US); Brian Lee Lawrence, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/952,513

(22) Filed: Sep. 28, 2004

(65) Prior Publication Data

US 2006/0066930 A1    Mar. 30, 2006

(51) Int. Cl.
*G03H 1/02* (2006.01)
*G03H 1/00* (2006.01)
*G11B 7/00* (2006.01)

(52) U.S. Cl. .................. 359/27; 359/3; 359/7; 359/12
(58) Field of Classification Search ............... 359/27, 359/3, 4, 7, 12
See application file for complete search history.

(56) References Cited

U.S. PATENT DOCUMENTS

| | | | |
|---|---|---|---|
| 4,819,206 A | 4/1989 | Yoshimura | |
| 5,249,189 A | 9/1993 | Scheps | |
| 5,757,827 A | 5/1998 | Makio et al. | |
| 6,272,095 B1 | 8/2001 | Liu et al. | |
| 6,700,896 B1 | 3/2004 | Beshai | |
| 6,721,076 B1 | 4/2004 | King et al. | |
| 2002/0015376 A1 | 2/2002 | Liu et al. | |
| 2003/0081644 A1* | 5/2003 | Krupke | 372/75 |
| 2003/0223101 A1 | 12/2003 | Curtis et al. | |

FOREIGN PATENT DOCUMENTS

| EP | 1 065 658 | 1/2001 |
|---|---|---|
| WO | WO 93/03427 | 2/1993 |

* cited by examiner

*Primary Examiner*—Fayez G. Assaf
(74) *Attorney, Agent, or Firm*—Ann M. Agosti; Patrick K. Patnode

(57) ABSTRACT

A wavelength multiplexed holographic system includes a wavelength tunable blue-violet laser and a controller for wavelength multiplexing. A method of holographic data recording includes providing a holographic medium, providing a tunable blue-violet laser for wavelength multiplexing, and tuning the laser wavelength to record a hologram at a set wavelength and recording holographic data at the set wavelength on the holographic medium. A method for retrieving holographic data includes providing a holographic medium, providing at least one tunable blue-violet laser, tuning the blue-violet laser to a set wavelength, and retrieving holographic data at the set wavelength.

47 Claims, 5 Drawing Sheets

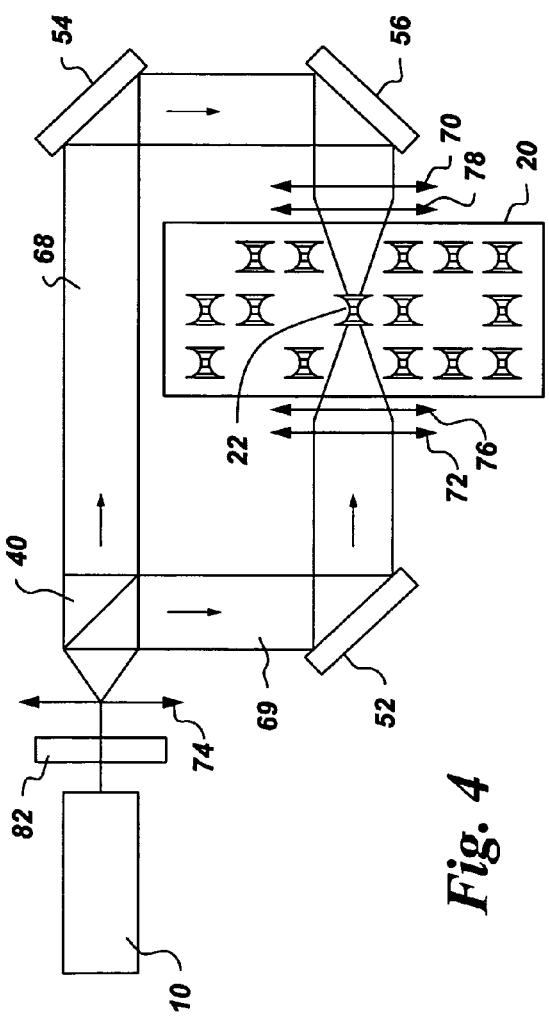
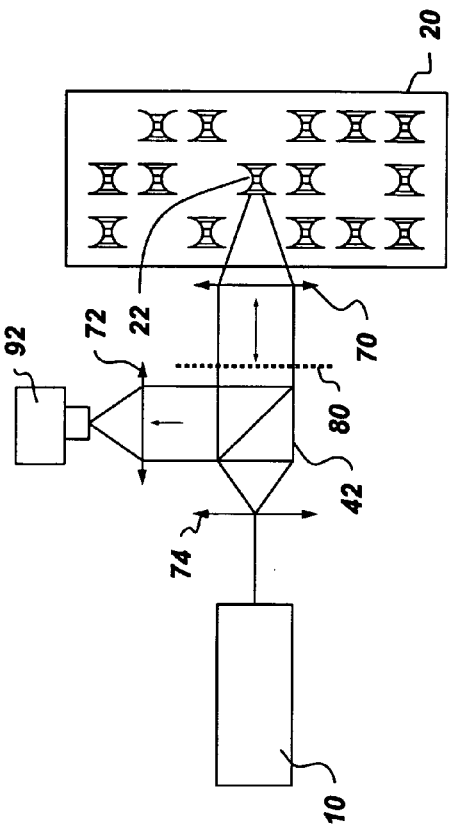
Fig. 4
Fig. 5

METHOD AND APPARATUS FOR HOLOGRAPHIC RECORDING AND RETRIEVAL

BACKGROUND

The invention relates generally to holographic devices. The invention particularly relates to wavelength multiplexed holographic devices.

An alternative approach to traditional surface-based storage systems like compact discs (CDs) or digital versatile discs (DVDs) is volumetric storage technology, in which the full volume of a storage medium is used to increase data capacity. Holographic storage is one type of volumetric storage technology. Holographic storage has the potential to provide relatively high data density and short access times as compared to conventional optical storage technologies.

In conventional volume holographic storage, or page based holographic storage, laser light from two beams, a reference beam and a signal beam containing encoded data, overlap within the volume of a photosensitive holographic medium. The interference pattern resulting from the overlap of the two beams creates a change or modulation of the refractive index of the holographic recording medium. Multiple bits are encoded and decoded together in pages, or two-dimensional arrays of bits. Multiple pages can be stored within the volume by angular, wavelength, phase-code, or related multiplexing techniques. Each page can be independently retrieved using its corresponding reference beam. The reference beam interacts with the stored refractive index modulation and reconstructs the signal beam containing the encoded data. The parallel nature of this storage approach allows high transfer rates and short access times.

In bit-wise volume holography, data are stored bitwise in a photosensitive volume as microscopic reflection gratings called microholograms. A single micro-hologram corresponds to a single bit, where the presence or absence of a microhologram corresponds to a "1" or a "0" (or vice-versa). Overlapping microholograms can be stored in the same volume element by using multiplexing techniques, such as angle multiplexing or wavelength multiplexing. Such storage of multiple bits in the same volume element of the disk increases the storage capacity and potentially also the data transfer rates by the multiplex factor.

There is a constant requirement to find ways to increase the data storage density of holographic media. It is therefore desirable to find holographic systems and methods of using such systems, which help increase the data storage density.

BRIEF DESCRIPTION

Briefly, in accordance with one embodiment of the present invention, a wavelength multiplexed holographic system comprises a wavelength tunable blue-violet laser and a controller for wavelength multiplexing said laser of said holographic system.

In accordance with another aspect of the invention, a method for holographic recording comprises the steps of providing a holographic medium for recording the data, providing a tunable blue-violet laser for wavelength multiplexing, tuning the laser wavelength to record a hologram at a set wavelength and recording holographic data at the set wavelength.

In accordance with a further aspect of the invention, a method of retrieving holographic data comprises the steps of providing a holographic storage medium, providing at least one tunable blue-violet laser, tuning the blue-violet laser to a set wavelength and retrieving the holographic data at the set wavelength.

DRAWINGS

These and other features, aspects, and advantages of the present invention will become better understood when the following detailed description is read with reference to the accompanying drawings in which like characters represent like parts throughout the drawings, wherein:

FIG. 4 is a schematic view of a bit-wise holographic recording system in accordance with one embodiment of the present invention FIG. 5 is a schematic view of a bit-wise holographic retrieval system in accordance with one embodiment of the present invention

DETAILED DESCRIPTION

Figure 1:
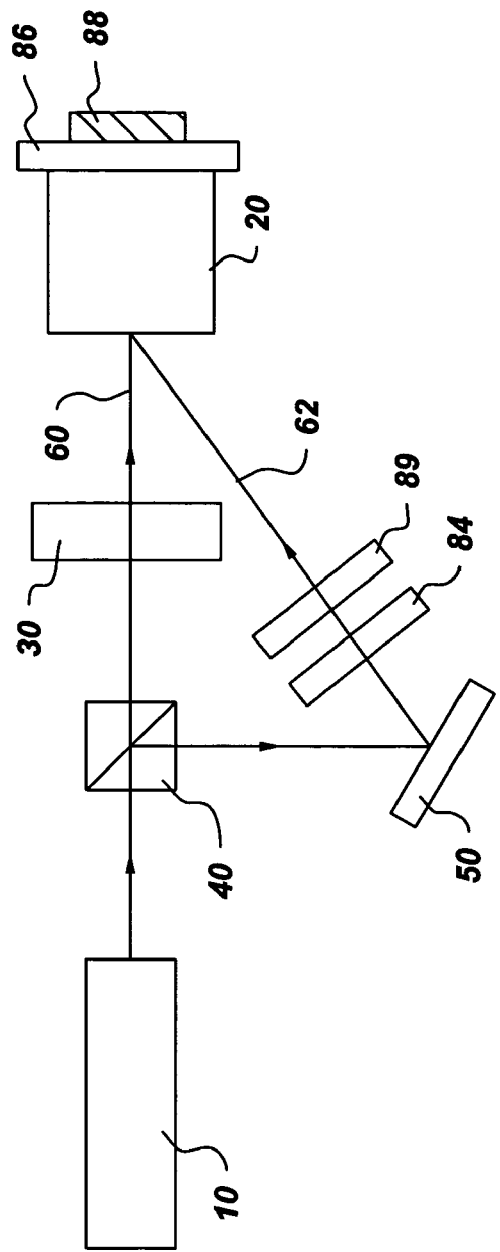
FIG. 1 is a schematic view of a page based holographic recording system in accordance with one embodiment of the present invention.

As used herein, the term "fundamental wavelength" refers to the wavelength of the radiation output by a lasing medium, the output of which may be wavelength shifted to another wavelength.

As used herein, the term "frequency doubled wavelength" refers to the output of a wavelength-shifting device such as a frequency doubling crystal, which may be configured to double the frequency of an input coherent radiation.

As used herein, the term "blue-violet laser" refers to a laser emitting radiation in the wavelength range about 375 nm to about 425 nm.

In holographic storage, to achieve very high data density, several holograms may be multiplexed in the same volume of the recording material. There are several holographic multiplexing techniques, including wavelength multiplexing, angle multiplexing, spatial multiplexing, and phase multiplexing. Wavelength multiplexing requires changing the optical wavelength of reference and signal beams used for recording each hologram in such a manner as to record holograms which do not interfere with each other and can be retrieved using the wavelength of the reference beam as the addressing mechanism.

The aspects of the present invention relate to wavelength multiplexed holographic systems and methods of usage thereof. The systems and methods that fall within the scope of this invention help increase the data density of holographic storage systems by wavelength multiplexing in the blue-violet region of the optical spectrum. This helps minimize the recording spot size and wavelength separation between holograms, thereby increasing data density. The shorter wavelengths of the blue-violet region of the spectrum provide a significant increase in data density relative to data density obtained with green and red regions of the optical spectrum commonly used in conventional holographic systems.

The desired minimum wavelength separation to minimize crosstalk between two recorded holographic gratings can be expressed as:

$$\Delta\lambda = \lambda^2/2nd \quad [1]$$

where $\Delta\lambda$ is the minimum wavelength separation, $\lambda$ is the center wavelength of a tunable laser, n is the refractive index of the holographic medium, d is the length of the hologram in the holographic medium. For example, if $\lambda$ is 532 nm, d is 200 µm, n is 1.5, then the minimum wavelength separation $\Delta\lambda$ is 0.47 nm. If $\lambda$ is changed to 405 nm, then the minimum wavelength separation $\Delta\lambda$ reduces to 0.28 nm. The wavelength range for wavelength multiplexing N number of holograms is given by $N\Delta\lambda$. At a wavelength of 532 nm, to multiplex 200 holograms typically requires a laser tuning range of 94 nm, whereas at 405 nm, a 55 nm tuning range is sufficient. Therefore, it is advantageous to wavelength multiplex in the shorter wavelength region.

It is also desirable from a cost standpoint to reduce the thickness of the holographic material while keeping the crosstalk or interference minimal. Wavelength multiplexing in the blue-violet region provides the advantage of increasing the data density while keeping the holographic material thin, comparable to currently available CDs.

Holographic storage and retrieval systems of the present invention typically utilize one or more laser sources, one or more laser beam modulators, and one or more types of photosensitive holographic media operating in conjunction. In one embodiment of the present invention, a holographic page-based data recording system as shown in FIG. 1, a wavelength tunable laser 10 emits coherent radiation in the blue-violet region of the spectrum, which is incident on a beam splitter 40. The beam splitter may be a diffractive optical splitter or other type of beam splitter. The laser beam is split into two or more beams, one beam, a reference beam 62, strikes one or more mirrors, such as mirror 50, configured to steer the reference beam 62 towards a particular location on a recording medium 20. A non-limiting example of a holographic medium 20 is a photosensitive recording medium, such as a photopolymer, a thermoplastic and/or an inorganic crystal material.

Figure 3:
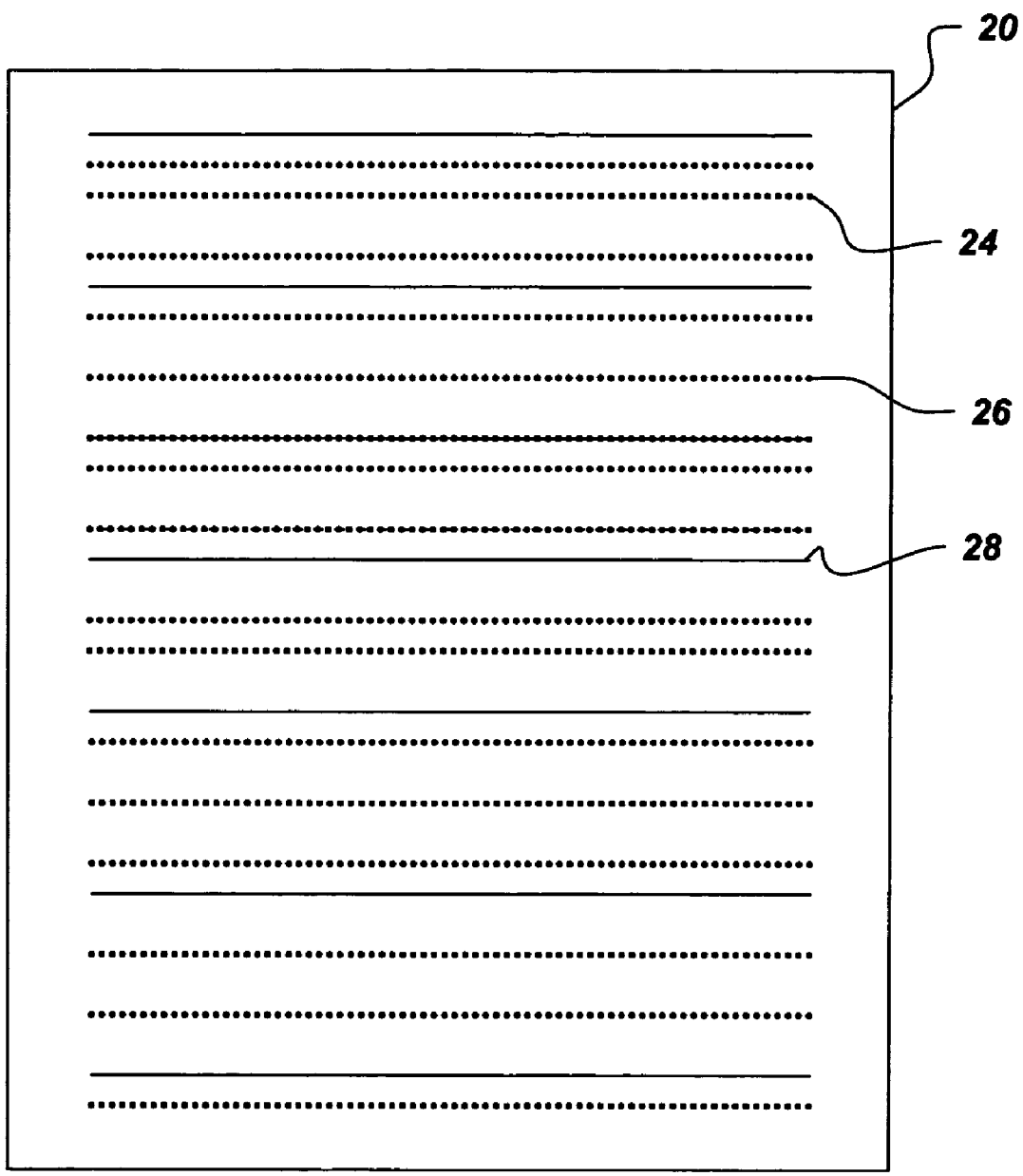
FIG. 3 is a schematic view of one example of a holographic medium with wavelength multiplexed holographic data.

A second beam is modulated by a data encoder 30 and emerges from the data encoder 30 as a signal beam 60. A data encoder is a spatial light modulator (SLM) such as a deformable mirror device (DMD) or a liquid crystal device, for example. The data encoder 30 encodes the data information to be recorded on to the signal beam 60. Data encoder 30 can be used in transmission (FIG. 1) or in reflection (not shown). The data is recorded as holographic or interference gratings. FIG. 3 is a schematic view of one example of a holographic medium 20 with wavelength multiplexed holographic data 24, 26, 28 recorded.

Figure 2:
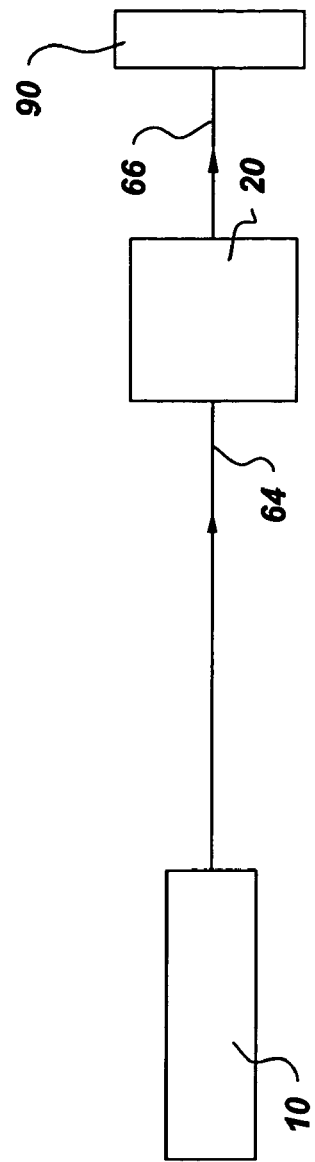
FIG. 2 is a schematic view of a page based holographic retrieval system in accordance with one embodiment of the present invention.

Another embodiment of the present invention is a page-based holographic retrieval system as shown in FIG. 2. In this embodiment, a readout beam 64 from a wavelength tunable laser 10 lasing in the blue-violet region is directed towards a holographic medium 20. Diffracted by a recorded hologram in the medium, the beam emerges as the data beam 66 with the encoded data and is projected on to a detector 90. Non-limiting examples of detectors include CCD (charge coupled device) arrays and CMOS (complementary metal oxide semiconductor) arrays.

It should be understood that it is within the scope of this invention that page based holographic recording and retrieval embodiments of this invention can be used either individually or in a single integrated system.

In a further embodiment of the present invention, a bit wise holographic recording system as shown in FIG. 4, a wavelength tunable laser 10 emits coherent radiation in the blue-violet region, which is split into at least two beams 68, 69 by beam splitter 40. Beams 68 and 69 are steered towards a point in the volume of a holographic medium by a series of mirrors 52, 54, 56. Focusing optics 72 and 74 focus the beams to a spot within the volume of the holographic medium. Focusing optics 72 and 74 enable the beams to be focused to spots at various depths within the volume of the holographic medium. The beams interfere within the volume of the medium 20 to record the data as holographic microgratings. In this embodiment, the invention may further comprise aberration correction optics 76 for aberration correction. In one embodiment, the beam output of the tunable laser 10 may be pulsed by using a pulsed pump device. In another embodiment, the output of the laser 10 may be pulsed using controllable shutters 82, electro-optic modulators or acousto-optic modulators, for example.

In another embodiment of the present invention, a bit wise holographic retrieval system as shown in FIG. 5, a wavelength tunable laser 10 emits coherent radiation in the blue-violet region. The beam is expanded by expanding optic 74 and transmitted through a polarizing beam splitter 42 and a quarter wave plate 80. The beam is refocused by a focusing optic 70 and is projected towards a micrograting 22 in a holographic medium 20. The beam reflected by the micrograting is incident on the quarter wave plate 80, which brings the polarization of the reflected beam at 90 degrees relative to the incident beam and is therefore reflected by the beam splitter 42 towards a detector 92, for example, a photodetector.

It should be understood that it is within the scope of this invention that bit wise holographic recording and retrieval embodiments of this invention can be used either individually or in a single integrated system.

It is within the scope of this invention that additional elements such as beam steering optics 84, sample rotators 86, sample translators 88, and/or phase modulators 89 may be present to enable additional modes of multiplexing such as angle multiplexing, spatial multiplexing (shift multiplexing and peristrophic multiplexing) and/or phase multiplexing to be used in conjunction with wavelength multiplexing.

In at least one embodiment of the holographic system, a laser cavity is incorporated which utilizes a multiple mirror design, such as in a frequency doubled configuration, which, in this context, refers generally to a laser cavity configuration wherein a laser source may pass through one or more components such as a crystal, resulting in a laser output frequency that is shifted from the original laser source, for example.

Figure 6:
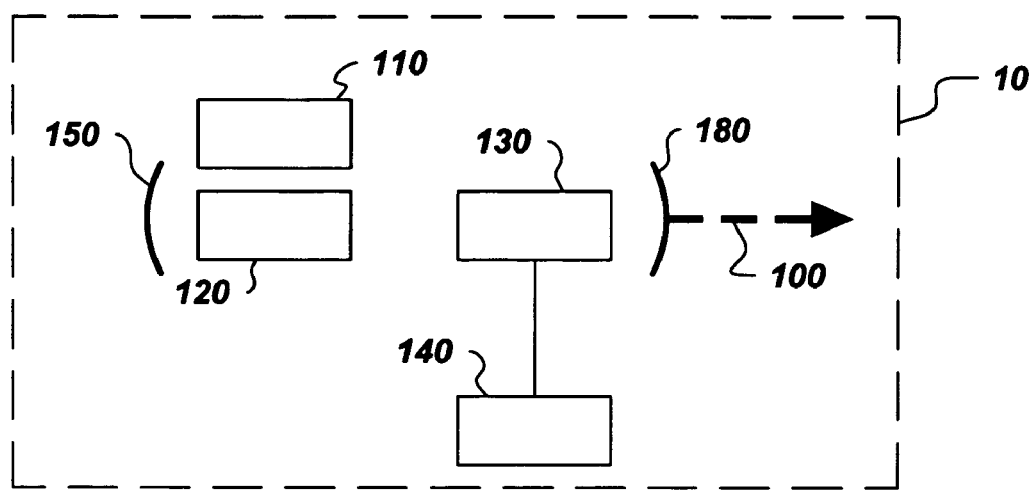
FIG. 6 is a schematic view of a laser system used in one embodiment of the present invention.

In one embodiment of the present invention, as shown in FIG. 6, a laser 10, comprises a lasing medium 120 with a broad gain curve pumped by a pumping device 110. This results in the production of coherent radiation of laser light substantially within a particular wavelength range. A non-limiting example of a pumping device is a diode laser. Non-limiting example of a lasing medium 120 is a Coloquiriite crystal, such as Cr:LiSAF (chromium-doped lithium strontium aluminum fluoride), Cr:LiSGAF (chromium-doped lithium strontium gallium aluminum fluoride), or Cr:LiCAF (chromium-doped lithium calcium aluminum fluoride). For example, the crystal may have particular dimensions or a particular shape, such as rectangular or cylindrical, in order to produce a desired output beam. For example crystals of the Coloquiriite family may be selected at least in part to generate a broad gain region in approximately the 750 nm to 850 nm spectral region. Other non-limiting examples of a lasing medium 120, are Ti:Sapphire crystals and Alexandrite crystals.

The coherent radiation produced by the lasing medium 120 is limited to a small wavelength range suitable for holographic recording by a selection device or one or more filters 130, which may be controlled and/or configured by a controller 140 to limit the radiation to substantially within one or more ranges of wavelengths of the electromagnetic spectrum. Non-limiting examples of wavelength selection devices are birefringent filters (BRF) and etalons. In one embodiment, the wavelength selection device 130 comprises a three-plate quartz BRF. The BRF is configured to operate substantially within a particular wavelength range. In this embodiment, wavelength adjustment is made by altering the orientation of one or more filters. In a non-limiting example, the line width of the frequency doubled output is about a 100 MHz.

Additionally or in another embodiment, filter 130 may comprise an etalon configured for producing an output beam having a substantially particular line width. Substantially particular line width means a line width less than 5 MHz. Depending at least in part on the type of material and/or combination of materials comprising the filters, the number of filters, and/or the particular configuration of the filters, for example, alterations may be possible wherein a laser beam passing through the filters may comprise a laser beam of an approximately single wavelength or of a single axial mode, and altering one or more properties of one or more filters may result in a laser beam of a differing wavelength, such as a laser beam of an approximately particular wavelength substantially incrementally larger or smaller, may be allowed to substantially pass through the filters. This may result, for example, in an output laser beam wherein the output beam is adjustable with respect to the wavelength of the laser output signal, and adjustments may be on an approximately incremental basis, such as nanometer by nanometer, or fractions of a nanometer, for example.

In one embodiment of the present invention, the blue-violet laser is tunable in discrete modes. The wavelength spacing between two adjacent modes transmitted by the filters, determine the mode spacing of the output of the blue violet laser. This enables the tuning of the blue-violet laser in discrete wavelength steps, within the wavelength range of the laser. Wavelength multiplexing at constant wavelength steps is thus possible.

In one embodiment of this invention, the lasing medium 120 and the wavelength selection device 130 are enclosed within a high reflector 150 and an output coupler 180. The fundamental wavelength beam 100 emerges out of the cavity at the output coupler 180.

Figure 7:
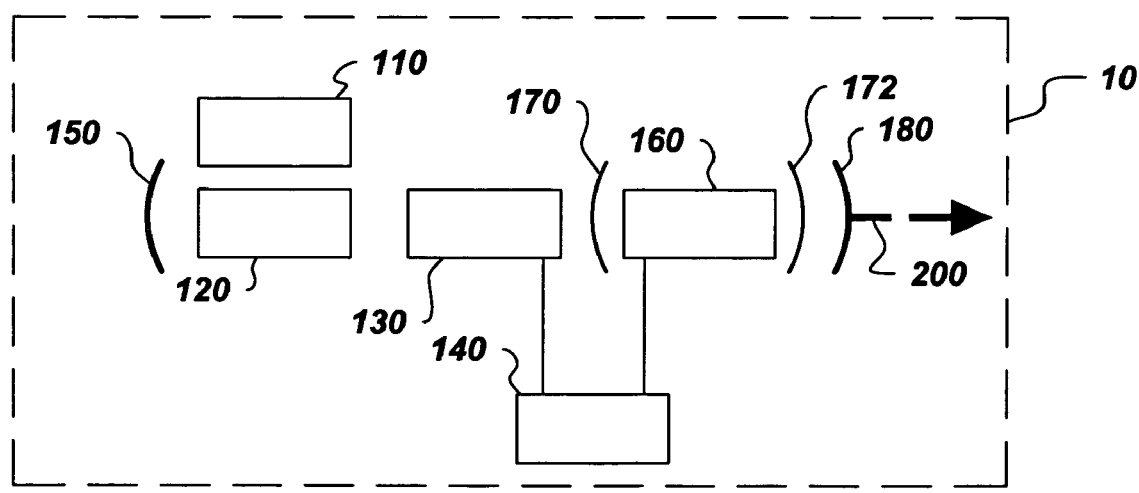
FIG. 7 is a schematic view of a laser system with intracavity frequency doubling used in one embodiment of the present invention.

In another embodiment of this invention, as shown in FIG. 7, a lasing cavity defined by a high reflector 150 and an output coupler 180 encloses a lasing medium 120, which is pumped by a pumping device 110. The output wavelength of the lasing cavity is controlled by the one or more filters 130 controlled by a controller 140. A doubling crystal 160 present within the cavity, at least partly converts a fundamental wavelength coherent radiation emitted by the lasing medium 120 to output coherent radiation 200 at about double the frequency. The doubling crystal 160 is tuned by the controller 140 in step with tuning the filters 130. It should be understood that other cavity arrangements of the elements shown in FIG. 7, such as a V or Z shaped cavity arrangement, instead of a linear cavity, is within the scope of this invention and can be used.

Cavity mirrors 170, 172 enclosing the doubling crystal 160 may also be present but are not required. The doubling crystal 160 may comprise an angle and/or temperature tuned nonlinear optical crystal, such as an angle and/or temperature tuned lithium triborate crystal (LBO), for example, to produce a desired output. Crystal 160 may be configured to modify one or more properties of the fundamental wavelength radiation. For example, crystal 160 may be configured to at least partially convert a fundamental wavelength beam 100 to a beam having a wavelength of approximately half of its previous wavelength, or the second harmonic 200. Other non-limiting examples of non-linear crystals include beta barium borate (BBO) and quasi phase matched lithium niobate. Properties of a beam that are modified by a crystal such as an optical crystal and the amount of modification that occurs depend at least in part on the material and/or combination of materials comprising the crystal. The claimed subject matter is not limited to a particular crystal wavelength.

For example, in some embodiments of the present invention, wherein a source generates a laser beam approximately within the wavelength range of 750 nm to 850 nm, a resultant output beam comprises a laser beam of approximately half of the source wavelength, approximately within a range of 375 nm to 425 nm. Further, the output wavelength is adjustable to approximately any wavelength within that particular range, such as approximately incrementally by a nanometer, resulting in a range of adjustment of approximately 50 nanometers, wherein the tunable laser is capable of operating in a single axial mode, for example.

Figure 8:
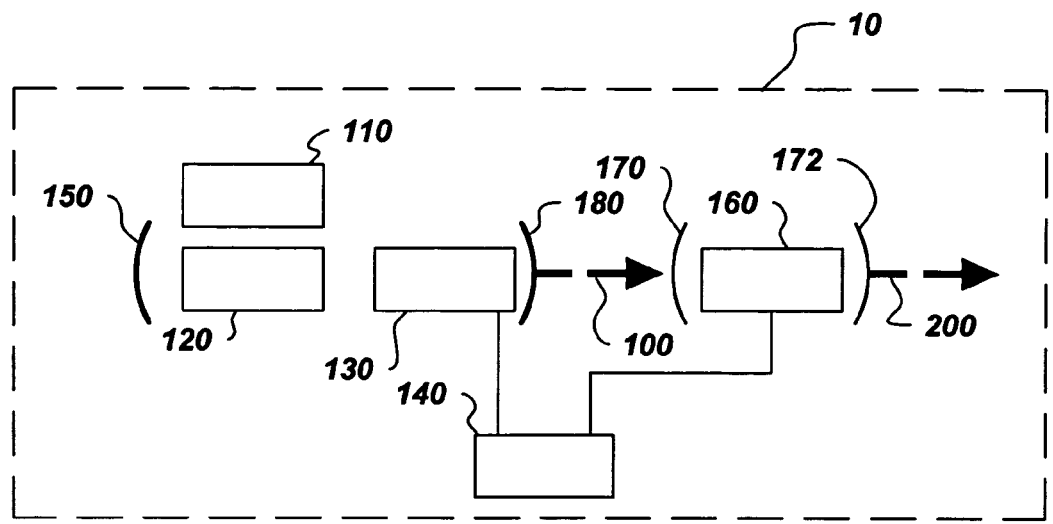
FIG. 8 is a schematic view of a laser system with external cavity frequency doubling used in one embodiment of the present invention.

It is within the scope of this invention that the doubling crystal for frequency doubling the fundamental wavelength may be present outside the cavity of the fundamental wavelength laser and is tuned by a controller in step with tuning the filters as shown in FIG. 8.

Figure 9:
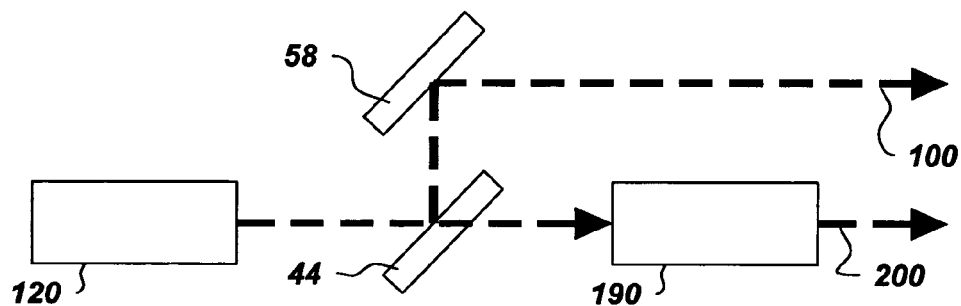
FIG. 9 is a schematic view of a laser system in one embodiment of the present invention.
Figure 10:
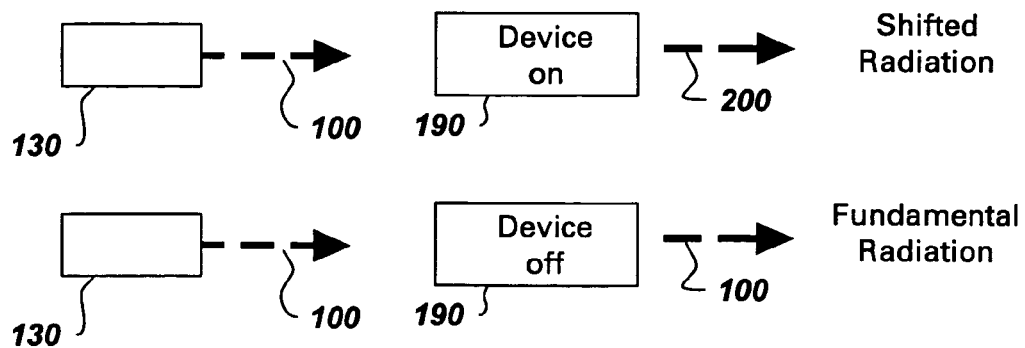
FIG. 10 is a schematic view of a laser system in one embodiment of the present invention.

In one embodiment of this invention as shown in FIG. 9, a fundamental wavelength beam 100 emerging from a lasing medium 120, is incident on a beam splitter 44 and is partially transmitted to a doubling crystal 160, and at least part of incident beam energy is converted to a frequency doubled wavelength beam 200. In another embodiment of the present invention as shown in FIG. 10, a fundamental wavelength 100 emerging from a lasing medium 120 is incident on a wavelength shifting device 190 which may be turned on or off as necessary, such that the light emerging through the device is wavelength shifted when required and allowed to pass through unaltered otherwise.

It is within the scope of this invention that recording and retrieval may be performed by beams at different frequencies. For example, a beam at a fundamental wavelength may be used for recording and a frequency shifted beam for retrieving. In another example, a frequency shifted beam may be used for recording and a beam at a fundamental wavelength for retrieving. In such examples, the system may be configured such that radiation at both the fundamental and frequency doubled wavelength may be coupled out of the cavity (FIG. 9 & FIG. 10).

In one aspect of this invention is a method for recording page based holographic data by tuning a blue-violet laser to a set wavelength and encoding data onto a signal beam using a spatial light modulator. The method further includes the step of overlapping a signal beam and a reference beam to a holographic medium to form an interference grating. The method further comprises overlapping the signal beam and the reference beam. The method of further comprises successively tuning the laser to different set wavelengths to record data associated with each wavelength. The method may additionally include recording successive holograms by angle multiplexing. The method may additionally include recording successive holograms by spatial multiplexing techniques, such as peristrophic multiplexing and shift multiplexing. The method may additionally include recording successive holograms by phase multiplexing.

In another aspect of this invention is a method of bit-wise holographic recording by tuning a blue-violet laser to a set wavelength, encoding data over at least part of the laser output and recording holographic data in the medium at the set wavelength. The method of recording may include the step of pulsing the output of the laser. Non-limiting example of pulsing the laser includes using a pulsed pumping device, using controllable shutters or using acousto-optic modulators. The method includes the step of overlapping two counter-propagating, focused laser beams to form a microhologram in the holographic medium. The method further comprises successively tuning the laser to different set wavelengths to record data associated with each wavelength. The method may additionally include the step of recording successive holograms by angle multiplexing. The method may additionally include the step of recording successive holograms by spatial multiplexing. The method may additionally include the step of recording successive holograms by phase multiplexing. The method may additionally include the step of recording successive holograms by angle multiplexing.

In another aspect of this invention is a method for retrieving page-based data. The method includes the steps of propagating the output of a tunable blue-violet laser set to a wavelength, readout beam, to a holographic medium with recorded data. The method further comprising detecting a reconstructed beam emerging from the holographic medium. For example the detector used may be a CCD array or a CMOS array. The data is retrieved page-wise. The method of further comprising propagating a read out beam to a stored interference grating in the holographic medium. The method may additionally include steps to retrieve data recorded by angle multiplexing, spatial multiplexing and/or phase multiplexing.

In a further aspect of this invention is a method of retrieving data as a single bit at each wavelength. The method includes the steps of propagating the output of a tunable blue-violet laser set to a wavelength to a microhologram in a holographic medium and detecting a reflected beam from the microhologram. To successively retrieve data by tuning the laser output to different wavelengths. The method may additionally include steps to retrieve data recorded by angle multiplexing, spatial multiplexing and/or phase multiplexing.

In a non-limiting example, a 2.5 W, 670 nm pump diode pumps a Cr:LiSAF crystal. The crystal is tunable in the range of about 750 nm to 850 nm. The output is frequency doubled by a LBO crystal. The frequency-doubled output is tunable in the range of about 375 nm to about 425 nm, with a minimum wavelength separation of about 0.3 nm and a linewidth of about 5 MHz. Holographic data can be recorded at any wavelength between about 375 nm and about 425 nm by tuning the BRF, with a wavelength separation between holograms larger than the wavelength separation required to minimize crosstalk between holograms.

Software and/or hardware may be used for performing one or more of the above-described operations. Additionally, although particular embodiments have just been described, the claimed subject matter is not limited in scope to a particular embodiment or implementation. For example, one embodiment may be in hardware, such as implemented to operate on a device or combination of devices, as previously described, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

The previously described embodiments of the present invention have many advantages, including being systems capable of high density recording and retrieval.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wavelength multiplexed holographic system comprising:
   a wavelength tunable blue-violet laser configured for providing a laser beam;
   a controller for wavelength multiplexing said laser of said holographic system; and one or more filters configured to limit the laser operation to a single frequency to enable creation of an interference pattern inside a holographic medium.

2. The holographic system of claim 1, wherein said laser is configured for producing coherent electromagnetic radiation in the range of about 375 nanometers to about 425 nanometers.

3. The holographic system of claim 1, wherein said laser comprises at least one fundamental crystal configured for lasing.

4. The holographic system of claim 3, wherein said at least one fundamental crystal comprises a coloquirite crystal.

5. The holographic system of claim 1, wherein said laser comprises at least one non-linear crystal configured for frequency doubling.

6. The holographic system of claim 5, wherein said at least one non-linear crystal comprises a lithium triborate crystal.

7. The holographic system of claim 1, wherein a fundamental wavelength range filtered by at least one of said filters is adjustable.

8. The holographic system of claim 7, wherein the fundamental wavelength range is adjustable between 750 and 850 nm.

9. The holographic system of claim 1, wherein at least one of the one or more filters comprises a birefringent filter.

10. The holographic system of claim 1, wherein at least one of the one or more filters comprises an etalon.

11. The holographic system of claim 1, wherein the holographic system further comprises beam steering optics for propagating the laser beam to a holographic medium.

12. The holographic system of claim 1, wherein the holographic system further comprises beam-splitting optics to split the laser beam into two or more beams.

13. The holographic system of claim 1 wherein the holographic system comprises a bit-wise holographic system.

14. The holographic system of claim 13 wherein the holographic system further comprises beam correction optics for aberration correction.

15. The holographic system of claim 13, wherein the holographic system further comprises beam focusing optics for focusing the laser beam into different depths in a holographic medium.

16. The holographic system of claim 13, wherein the holographic system further comprises shutters for pulsing the laser beam.

17. The holographic system of claim 13, wherein the holographic system further comprises at least one detector configured for detecting a data output from a holographic medium.

18. The holographic system of claim 1, wherein the holographic system is a page based system.

19. The holographic system of claim 18, wherein the holographic system further comprises a data encoder.

20. The holographic system of claim 19, wherein the data encoder is a spatial light modulator.

21. The holographic system of claim 18, wherein the holographic system further comprises a detector.

22. The holographic system of claim 21, wherein the detector is a CCD array or a CMOS array.

23. The holographic system of claim 1, further comprising at least one of a steering optic or a sample rotator for angle multiplexing.

24. The holographic system of claim 1, further comprising at least one of a steering optic, a sample translator, or a sample rotator for spatial multiplexing.

25. The holographic system of claim 1, further comprising at least one phase modulator for phase multiplexing.

26. The holographic system of claim 1, further configured for recording data at a fundamental wavelength and retrieving data at a frequency doubled wavelength.

27. The holographic system of claim 1, further configured for recording data at a frequency doubled wavelength and retrieving data at a fundamental wavelength.

28. A method of holographic data recording comprising:
providing a holographic medium for recording data;
providing a tunable blue-violet laser for wavelength multiplexing comprising one or more filters to limit the laser operation to a single frequency to enable creation of an interference pattern inside a holographic medium;
tuning the laser wavelength to record a hologram at a set wavelength; and
recording holographic data in the medium at the set wavelength.

29. The method of claim 28, further comprising successively tuning the laser to different set wavelengths to record data associated with each wavelength.

30. The method of claim 28, wherein recording comprises bit-wise holographic recording.

31. The method of claim 30, wherein recording further comprises pulsing the output of the laser.

32. The method of claim 30, wherein recording further comprises overlapping two counter-propagating, focused laser beams to form a microhologram in the holographic medium.

33. The method of claim 30, wherein recording comprises page based holographic recording.

34. The method of claim 33, wherein recording further comprises encoding data onto a signal beam using a spatial light modulator.

35. The method of claim 33, wherein recording further comprises propagating the signal beam and a reference beam to a holographic medium.

36. The method of claim 35, wherein recording further comprises overlapping the signal beam and the reference beam in the holographic medium to form an interference grating.

37. The method of claim 28, wherein recording further comprises recording successive holograms by angle multiplexing.

38. The method of claim 28, wherein recording further comprises recording successive holograms by spatial multiplexing.

39. The method of claim 28, wherein recording further comprises recording successive holograms by phase multiplexing.

40. A method of retrieving holographic data comprising:
providing a holographic medium with recorded data;
providing at least one tunable blue-violet laser comprising one or more filters to limit the laser operation to a single frequency to enable reading of an interference pattern inside a holographic medium;
tuning the blue-violet laser to a set wavelength; and
retrieving data at the set wavelength.

41. The method of claim 40, further comprising successively tuning the laser to different set wavelengths to retrieve data associated with each wavelength.

42. The method of claim 40, wherein a retrieved data is a single bit at each wavelength.

43. The method of claim 42, further comprising propagating the laser beam to a microhologram in the holographic medium.

44. The method of claim 43, further comprising detecting a reflected beam from the microhologram.

45. The method of claim 40, wherein the retrieved data is in a page-based format.

46. The method of claim 45, further comprising propagating a read out beam to a stored interference grating in the holographic medium.

47. The method of claim 46, further comprising detecting a reconstructed beam emerging from the holographic medium.

* * * * *